United States Patent [19]

Tatani et al.

[11] 4,297,332

[45] Oct. 27, 1981

[54] METHOD FOR TREATMENT OF A DISCHARGE LIQUID PRODUCED IN TREATMENT OF AN EXHAUST GAS

[75] Inventors: Atsushi Tatani, Hiroshima; Susumu Okino, Yamaguchi, both of Japan

[73] Assignee: Mitsubishi Jukogyo Kabushiki Kaisha, Tokyo, Japan

[21] Appl. No.: 112,444

[22] Filed: Jan. 16, 1980

[30] Foreign Application Priority Data

Jan. 18, 1979 [JP] Japan .................................. 54-4132

[51] Int. Cl.$^3$ .............................................. C01B 7/00
[52] U.S. Cl. ...................................... 423/240; 55/71; 55/73; 55/85; 55/89; 423/244; 423/242
[58] Field of Search ................... 55/71, 73, 85, 89; 210/59; 423/242 A, 240, 244; 106/1, 718, 120

[56] References Cited

U.S. PATENT DOCUMENTS

| | | | |
|---|---|---|---|
| 3,720,609 | 3/1973 | Smith et al. .......................... 210/59 |
| 3,785,840 | 1/1974 | Minnick et al. ............. 106/DIG. 1 |
| 3,859,799 | 1/1975 | Jaco, Jr. ....................... 106/DIG. 1 |
| 4,024,220 | 5/1977 | Ostroff et al. .................. 423/242 A |
| 4,147,756 | 4/1979 | Dahlstrom et al. ...................... 55/85 |
| 4,150,096 | 4/1979 | Nelms et al. ..................... 423/242 A |

FOREIGN PATENT DOCUMENTS

1961048  6/1971  Fed. Rep. of Germany .......... 55/85

*Primary Examiner*—Bernard Nozick
*Attorney, Agent, or Firm*—Wenderoth, Lind & Ponack

[57] ABSTRACT

A process for treating an exhaust gas discharged from a coal combustion apparatus, in which the exhaust gas is first led to a dry type dust collecting device, and after fly ash in said exhaust gas is removed, said exhaust gas is treated by a wet type exhaust gas cleaning device; a part of said fly ash collected in said dry type dust collecting device is added to a discharge liquid or a discharge sludge discharged from said wet type exhaust gas cleaning device. The amount of the fly ash to be added to the discharge sludge should be at least three times (in weight) as much as the amount of water contained in said discharge sludge. Preferably fly ash of approximately the same weight as that of said discharge sludge should be added to the discharge sludge discharged from said wet type exhaust gas cleaning device, and subsequently calcium hydroxide of about one-tenth in weight of said discharge sludge should be added to the mixture for solidifying said discharge sludge. In a preferred embodiment, the mixture of the discharge liquid and the fly ash is led to a solid-liquid separator to separate the mixture into clear water and sludge, and the clear water is returned to said wet type exhaust gas cleaning device, while the separated sludge is mixed with additional fly ash to further eliminate a discharge water.

6 Claims, 6 Drawing Figures

METHOD FOR TREATMENT OF A DISCHARGE LIQUID PRODUCED IN TREATMENT OF AN EXHAUST GAS

The present invention relates to a method for treatment of a discharge liquid produced in an apparatus for treatment of an exhaust gas discharged from a coal combustion apparatus, and more particularly, to such a method which results in eliminating a discharge water.

In an exhaust gas discharged from a coal combustion apparatus, such as a boiler in a coal-burning steam power station, there are contained fly ash and $SO_2$, hence the exhaust gas is cleaned by means of a dust collector and other exhaust gas treating devices. A method of removing fly ash by means of a dry type dust collecting device, such as a mechanical dust collector or an electrostatic dust collector, and then removing $SO_2$ by means of a wet type desmoking and desulfurizing device, has been well known.

Figure 1:
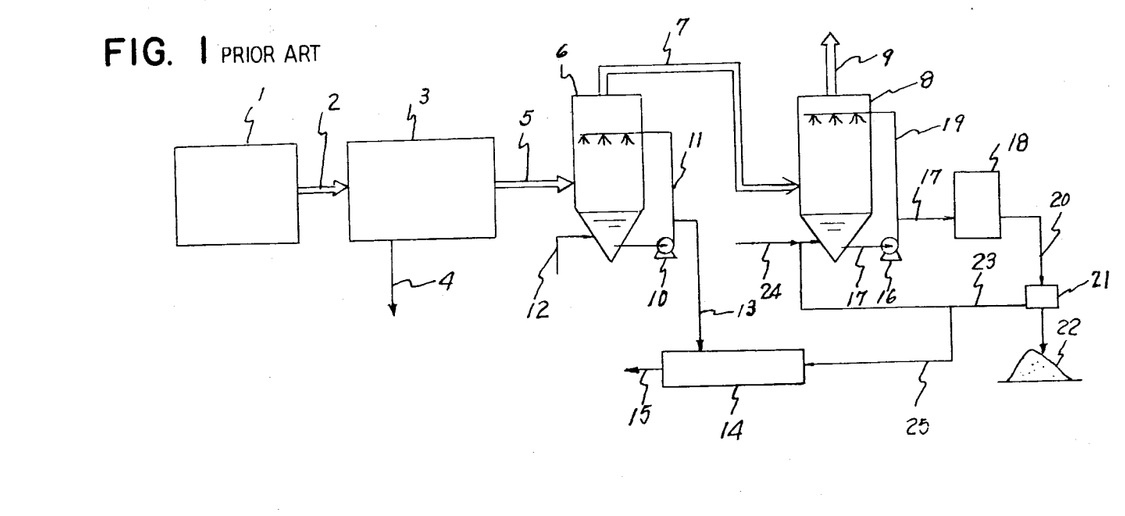
Figure 2:
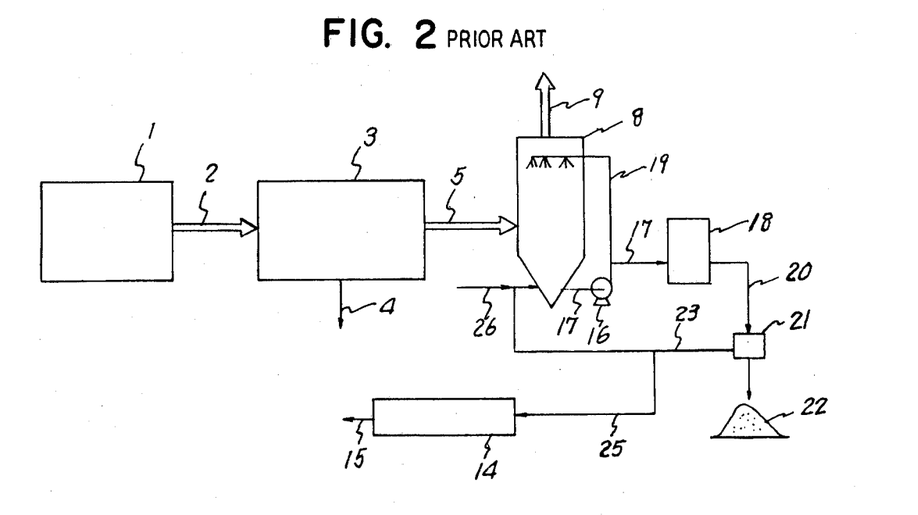
Figure 3:
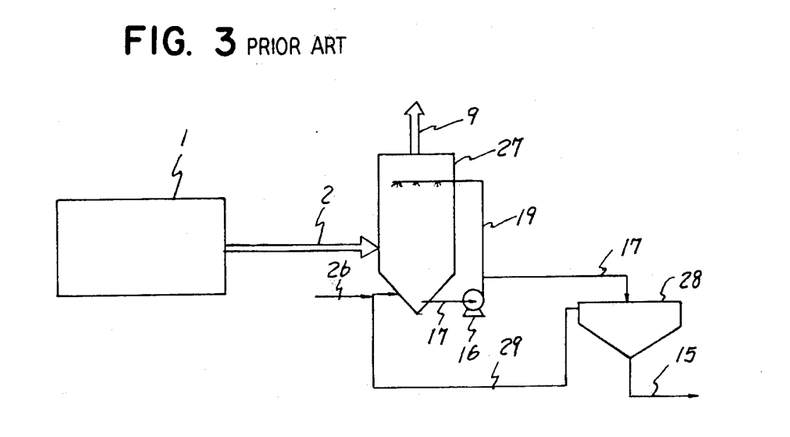

Examples of heretofore known processes for treatment of a coal boiler exhaust gas are illustrated in FIGS. 1 to 3.

At first, an exhaust gas treatment in the prior art will be explained with reference to FIG. 1.

An exhaust gas 2 from a coal boiler 1 is led to a dry type dust collecting device 3, in which fly ash 4 contained in the exhaust gas is removed. Next, the exhaust gas 5 having most of the fly ash 4 removed is led to a cooling tower 6 where it is humidified and cooled, thereafter it is led to an absorption tower 8 through a line 7 to be cleaned, and then it is discharged to the atmosphere as a cleaned exhaust gas 9. In the cooling tower 6, humidification and cooling of the exhaust gas 5 are effected by spraying a cleaning liquid 11 while it is circulated by a pump 10, so that in order to supplement evaporated water, a supply water 12 is fed to the cooling tower 6. Furthermore, for the purpose of preventing impurities contained in the exhaust gas from accumulating and causing troubles in the apparatus, a part of the cleaning liquid 11 is taken out through a line 13, passed through a discharge water treatment device 14, and discharged through a discharge line 15. Slurry containing calcium sulfite that is produced in the absorption tower 8 by absorbing $SO_2$ contained in the exhaust gas is fed through a line 17 to an oxidation tower 18 by a pump 16, and it is converted into gypsum slurry by airing. In addition, a part of the slurry flowing through the line 17 is circulated through a line 19 to be sprayed in the absorption tower 8.

The gypsum slurry from the oxidation tower 18 is passed through a line 20 and separated into a by-product of gypsum 22 and a filtrate 23 in a solid-liquid separator 21, and most of the filtrate 23 is returned to the absorption tower 8 after being mixed with milk of lime 24 or $Ca(OH)_2$ or $CaCO_3$. On the other hand, for the purpose of preventing accumulation of impurities, a part of the filtrate 23 is passed through the discharge water treatment device 14 via a line 25, and is discharged through a discharge line 15.

As described above, in the prior art process illustrated in FIG. 1, for the purpose of preventing impurities from accumulating within the exhaust gas treatment system, water is discharged to the outside of the system.

Now another exhaust gas treatment in the prior art will be explained with reference to FIG. 2.

In FIG. 2, the cooling tower 6 in FIG. 1 is omitted, and an exhaust gas 5 from a dry type dust collecting device 3 is led to an absorption tower 8, a cleaned exhaust gas 9 is discharged to the atmosphere, and in place of the milk of lime 24 in FIG. 1, slurry of calcium carbonate 26 is fed to the absorption tower 8.

In the flow sheet in FIG. 2, in order to prevent impurities carried by an exhaust gas from accumulating in the water within the system which circulates through the path of absorption tower 8→oxidation tower 18→solid-liquid separator 21→absorption tower 8 and causing troubles in the exhaust gas treatment apparatus, a large amount of water is discharged to the outside of the system.

Moreover, still another exhaust gas treatment in the prior art will be explained with reference to FIG. 3. The characteristic point of the prior art shown in FIG. 3 is that the dry type dust collecting device 3 is not provided, and an exhaust gas 2 discharged from a coal boiler 1 is led to a wet type dedusting and desulfurizing tower 27, in which fly ash and $SO_2$ in the exhaust gas 2 are simultaneously removed, and the residual gas is discharged as a clean exhaust gas 9 to the atmosphere.

Then, the slurry containing calcium sulfite and fly ash which is produced in the dedusting and desulfurizing tower 27 by absorbing $SO_2$, is fed through a line 17 to a thicker 28, in which an overflow portion and an underflow portion are separated from each other. The fluid consisting of the overflow portion is mixed through a line 29 with calcium carbonate slurry 26 or $Ca(OH)_2$ or $CaCO_3$, and then returned to the dedusting and desulfurizing tower 27. On the other hand, the fluid consisting of the underflow portion becomes a slurry having a relatively high solid material concentration which contains fly ash and calcium sulfite, so that the slurry is discharged through a discharge line 15 to an enormous pool, not shown, while varying the slurry concentration of the fluid consisting of the underflow portion and regulating the amount of the discharge water by manipulating the thicker 28. Then the fluid consisting of the underflow portion discharged to the enormous pool is condensed by natural evaporation of water, and the upper clear liquid obtained in the pool is discharged to rivers after it has been subjected to discharge water treatment.

In the flow sheet shown in FIG. 3, an extremely great amount of discharge water is discharged jointly with solid materials such as fly ash and calcium sulfite as a result of the exhaust gas treatment. Therefore, while the illustrated process has been generally employed in the region where a large site is available for installing the exhaust gas treatment system, it can hardly be employed in a region where only a limited site is available for the installation.

In every one of the prior art systems illustrated in FIGS. 1 to 3, a large amount of water in the system is discharged to the outside of the system, and hence these prior art systems were uneconomical in that a measure for preventing secondary public nuisances was necessitated and also a large amount of fresh water was consumed.

Therefore, the present inventors have conducted many research investigations for reducing the amount of liquid discharged to the outside of the exhaust gas treatment system upon treating a discharge fluid in the exhaust gas treatment system, and as a result, the following knowledge has been attained.

That is, in the coal combustion exhaust gas there are contained HCl and HF in addition to fly ash and $SO_2$, and these materials cause accumulation of chlorides and fluorides in the liquid within the wet type exhaust gas treatment system. Among these, especially the fluorides would bring about extremely undesirable results for the wet type exhaust gas treatment system, such that they lower desulfurization performance, promote deposition of scale within the absorption tower, and corrode the apparatus, and therefore, for the purpose of preventing accumulation of these respective compounds and discharging them, a large amount of discharge water was used. The present invention has been accomplished on the basis of the above-mentioned knowledge.

Therefore, it is one object of the present invention to provide a novel method for treatment for treatment of a discharge liquid produced in a process for treatment of an exhaust gas, in which the above-mentioned disadvantages are obviated and discharge of water to the outside of the treatment system can be eliminated.

According to one feature of the present invention, there is provided a method for treatment of a discharge liquid produced in a process for treatment of an exhaust gas, which process consists of the steps of leading an exhaust gas discharge from a coal combustion apparatus to a dry type dust collecting device to remove fly ash in said exhaust gas, and thereafter treating said exhaust gas by means of a wet type exhaust gas cleaning device, characterized in that a part of said fly ash collected in said dry type dust collecting device is added to a discharge liquid or a discharge sludge discharged from said wet type exhaust gas cleaning device, and thereby a discharge water can be eliminated.

According to another feature of the present invention, is provided an above-featured method of treatment of a discharge the amount of the fly ash to be added to the discharge sludge discharged from the wet type exhaust gas cleaning device is at least three times (in weight) as much as the amount of water contained in said discharge sludge.

According to still another feature of the present invention, there is provided a method for treatment of a discharge liquid produced in a process for treatment of an exhaust gas, which process consists of the steps of leading an exhaust gas discharged from a coal combustion apparatus to a dry type dust collecting device to remove fly ash in said exhaust gas, and thereafter treating said exhaust gas by means of a wet type exhaust gas cleaning device, characterized in that said fly ash collected in said dry type dust collecting device is added to a discharge sludge from said wet type exhaust gas cleaning device in approximately the same weight as that of said discharge sludge, and subsquently calcium hydroxide of about one-tenth in weight of said discharge sludge is added to the mixture to solidify said discharge sludge.

According to yet another feature of the present invention, there is provided a method for treatment of a discharge liquid produced in a process for treatment of an exhaust gas, which process consists of the steps of leading an exhaust gas discharged from a coal combustion apparatus to a dry type dust collecting device to remove fly ash in said exhaust gas, and thereafter treating said exhaust gas by means of a wet type exhaust gas cleaning device, characterized in that a part of said fly ash collected in said dry type dust collecting device is added to a discharge liquid discharged from said wet type exhaust gas cleaning device, thereafter the mixing is led to a solid-liquid separating device to separate the mixture into clear water and sludge, and the clear water is returned to said wet type exhaust gas cleaning device, while the separated sludge is mixed with an additional amount of said fly ash to further eliminate; a discharge water.

The above-mentioned and other features and objects of the present invention will become more apparent by reference to the following detailed description of its preferred embodiments taken in conjunction with FIGS. 4 to 6, wherein.

Now one preferred embodiment of the present invention will be explained with reference to FIG. 4.

Figure 4:
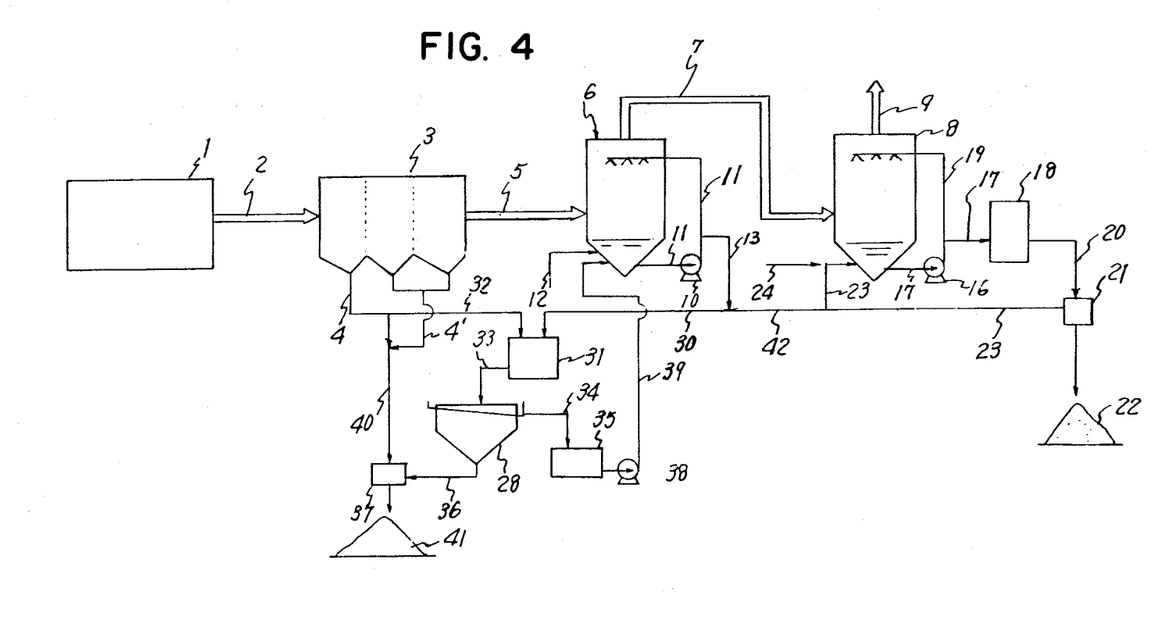
FIG. 4 is a flow sheet of one preferred embodiment of the process for treatment of a coal boiler exhaust gas according to the present invention.

In FIG. 4, reference numeral 1 designates a coal boiler, numeral 2 designates an exhaust gas discharged from the coal boiler 1, numeral 3 designates a dry type dust collecting device, numerals 4 and 4' designates fly ash collected in the dry type dust collecting device 3, numeral 5 designates an exhaust gas having most of the fly ash 4 and 4' removed, numeral 6 designates a cooling tower, numeral 7 designates an exhaust gas which has been humidified and cooled and has most of HCl, a part of $SO_2$ and most of the remaining fly ash removed in the cooling tower 6, numeral 8 designates an absorption tower, numeral 9 designates a cleaned exhaust gas, numeral 10 designates a circulating pump for a cleaning liquid 11, numeral 12 designates a supply water provided to the interior of the cooling tower, numeral 16 designates a circulating pump for the absorption tower 8, numeral 18 designates an oxidation tower, numeral 21 designates a solid-liquid separator, a numeral 22 designates a by-product of gypsum fed from the solid-liquid separator 21, numeral 23 designates a filtrate fed from the solid-liquid separator 21, numeral 24 designates milk of lime supplied to the absorption tower 8 together with the filtrate 23, numeral 28 designates a thickener, numeral 31 designates a mixing tank, numeral 33 designates slurry fed from the mixing tank 31, numeral 35 designates a clear liquid tank, numeral 37 designates a fly ash mixing machine, numeral 38 designates a pump for returning the clear liquid obtained in the clear liquid tank 35 to the cooling tower 6, numeral 41 designates mixed ash fed from the fly ash mixing machine 37, and reference numerals 13, 17, 19, 20, 30, 32, 34, 36, 39, 40 and 42 designate pipe lines connecting the above mentioned respective items.

In the above-described construction, the exhaust gas 2 from the coal boiler 1 is led to the dry type dust collecting device 3 such as a multi-cyclone, an electrostatic dust collector, etc. to remove the fly ash 4 and 4' contained in the exhaust gas 2. The exhaust gas 5 having most of the fly ash 4 and 4' removed therefrom is subsequently led to the cooling tower 6 in which the cleaning liquid 11 is sprayed to humidify and cool the exhaust gas and also to remove most of HCl and HF in the exhaust gas, a part of $SO_2$ therein and most of the fly ash which has passed the dry type dust collecting device 3. The exhaust gas 7 flowing out of the cooling tower 6 is then led to the absorption tower 8 in which slurry containing $CaCO_3$ or $Ca(OH)_2$ as an absorbent is sprayed through the line 19, and after most of the $SO_2$ contained in the exhaust gas has been removed, it is discharged to the atmosphere as cleaned exhaust gas 9. In the cooling tower 6, the cleaning liquid 11 is sprayed while being circulated by the pump 10, and in order to prevent the HF collected from the exhaust gas from accumulating as fluorides, a part of the cleaning liquid 11 is extracted via the line 13 and fed to the mixing tank 31 through the line 30. This cleaning liquid is an acidic liquid containing chlorides, sulfides, fly ash and other complexed compounds produced by many kinds of elements resolved from the fly ash, in addition to fluorides, and in order to protect the equipment of cooling tower 6, and also maintain an efficient performance of removing HF and HCl from the exhaust gas, it is necessary to lower the concentration of these compounds. Therefore, in the mixing tank 31, the fly ash 4 collected in the dry type dust collecting device 3 and flowing into the tank 31 through the line 32 is made to react with the cleaning liquid flowing into the tank via the lines 13 and 30.

The slurry 33 fed from the mixing tank 31 is passed to the thickener 28, where separation is effected such that a clear liquid is fed to the clear liquid tank 35 via the line 34, while sludge forming an underflow is fed to the fly ash mixing machine 37 via the line 36. Most of the fluorides are passed to the fly ash mixing machine 37 as an underflow of the thickener 28 to be mixed with the fly ash, while the clear liquid is passed through the clear liquid tank 35 and is returned to the cooling tower 6 through the line 39 by the action of the pump 38, so that the concentration of the fluorides in the cleaning liquid within the cooling tower 6 can be controlled to remain low. A part of the fly ash 4 and 4' collected in the dry type dust collecting device 3 is fed to the fly ash mixing machine 37 through the line 40 to be mixed with the sludge fed as the underflow of the thickener 28. Since the fly ash 4 and 4' is highly hygroscopic, it would adsorb the moisture in the sludge, so that the mixed ash 41 discharged from the fly ash mixing machine 37 becomes a material that is only slightly wet, which is easy handled such as in transportation by trucks or the like, and thus elimination of a discharge water from a wet type exhaust gas cleaning device can be achieved.

The amount of the fly ash 4 and 4' fed from the dry type dust collecting device 3 to the fly ash mixing machine 37 is preferably regulated depending upon the moisture content in the sludge fed as the underflow of the thickener 28 so that bleeding may not occur in the mixed ash 41, and according to the results of experiments conducted by the present inventors, it was found that if the amount of fly ash mixed with the sludge is at least three times (in weight) as much as the weight of the moisture in the sludge, bleeding would not occur at all. Here, the term "bleeding" means a phenomenon that water oozes out of the mixed ash 41.

Subsequently, a part of the slurry produced by absorbing $SO_2$ in the absorption tower 8, and containing calcium sulfite, is fed to the oxidation tower 18 through the line 17, and it is converted into gypsum slurry by airing.

The gypsum slurry fed from the oxidation tower 18 is passed through the line 20 into the solid-liquid separator 21, in which it is separated into a by-product of gypsum 22 and a filtrate 23, and most of the filtrate is returned to the absorption tower 8 after being mixed with the milk of lime 24 or $Ca(OH)_2$ or $CaCO_3$. On the other hand, a part of the filtrate 23 is fed through the line 42 to the mixing tank 31. This is for the purpose of preventing impurities from accumulating in the filtrate 23.

Now the method for adding the fly ash collected in the dry type dust collecting device 3 will be described in greater detail.

As the dry type dust collecting device, mechanical dust collectors as well as electrostatic dust collectors have been known, and in a preferred embodiment of the present invention, there is selectively used fly ash consisting of relatively large particles, which can be obtained from the upstream side of the dry type dust collecting device 3 and then fed to the mixing tank 31, as shown in FIG. 4. Especially, in case where a mechanical dust collector is provided on the upstream side of the exhaust gas flow, and an electrostatic dust collector is provided on the downstream side of the exhaust gas flow, it is preferable to feed the fly ash 4 collected in the mechanical dust collector to the mixing tank 31.

In addition, preferably, ash and clinker discharged from the bottom of the coal boiler 1 and fly ash taken out of devices located on the upstream side of the dry type dust collecting device such as, for example, an air heater, an economizer, etc. are fed to the mixing tank 31.

More particularly, the fly ash 4 to be mixed, in the mixing tank 31, with the cleaning liquid 11 taken out of the cooling tower via the lines 13 and 30 has a higher reactivity since it contains more large particles, and thus it reacts well with fluorides and sulfides in the cleaning liquid 11.

Figure 5:
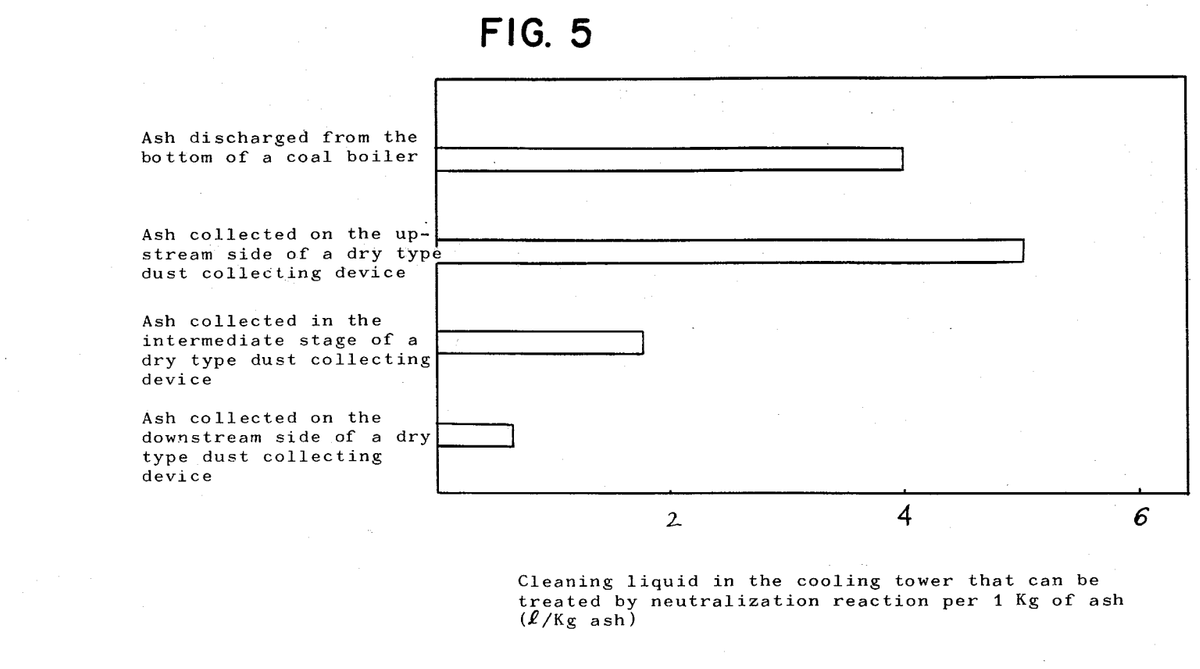
FIG. 5 is a diagram showing results of experiments conducted for investigating the relation between locations where fly ash was collected in the dry type dust collecting device for a coal boiler exhaust gas in the preferred embodiment shown in FIG. 4, and reactivity of the collected fly ash.

FIG. 5 shows results of experiments for comparing reactivities of fly ash samples with respect to fly ash samples collected on the upstream side and downstream side of the exhaust gas flow. From these experimental results it has become obvious that when fly ash and a cleaning liquid are mixed together, acidic compounds in the cleaning liquid are neutralized, especially fluorides resolved in the cleaning liquid are absorbed by the fly ash, and thereby the amount of soluble fluorides in the cleaning liquid represents only a small concentration.

While it has been well known that in general NaOH or $Ca(OH)_2$ are used to effect neutralization treatment of an acidic discharge water, it was difficult for NaOH to convert fluorides into insoluble compounds. This is considered to be due to the fact that the fluorides are converted into NaF having a large solubility [According to the disclosure in "KAGAKU BENRAN KISO-HEN I (Handbook of Chemistry, Volume of Fundamentals I)" published by Maruzen Book Co., the solubility in water of NaF is given to be 4.3 (g/100 g water) at 25° C.] On the other hand, if $Ca(OH)_2$ is used, then the fluorides contained in the cleaning liquid in the cooling tower 6 will be converted into $CaF_2$. [According to the disclosure in "KAGAKU BENRAN KISO-HEN I" (Maruzen) the above handbook the solubility of $CaF_2$ is very small only 0.0017 (g/100 g water) at 26° C.] However, the separate $CaF_2$ becomes extra fine particles which do not precipitate in the thickener, and even in the case of passing the cleaning liquid through a filtering device, a clear liquid cannot be obtained.

As described above, although it is difficult to remove fluorides in the case where NaOH or $Ca(OH)_2$, which has been heretofore widely used as a neutralizing agent, is employed, in the case of employing fly ash having a relatively large particle diameter it has become possible to effectively treat fluorides, and moreover, in a desmoking and desulfurizing apparatus the main treatment of fluorides has become possible by means of a reasonable combination of components including the utilization of fly ash obtained from the dry type dust collecting device.

Figure 6:
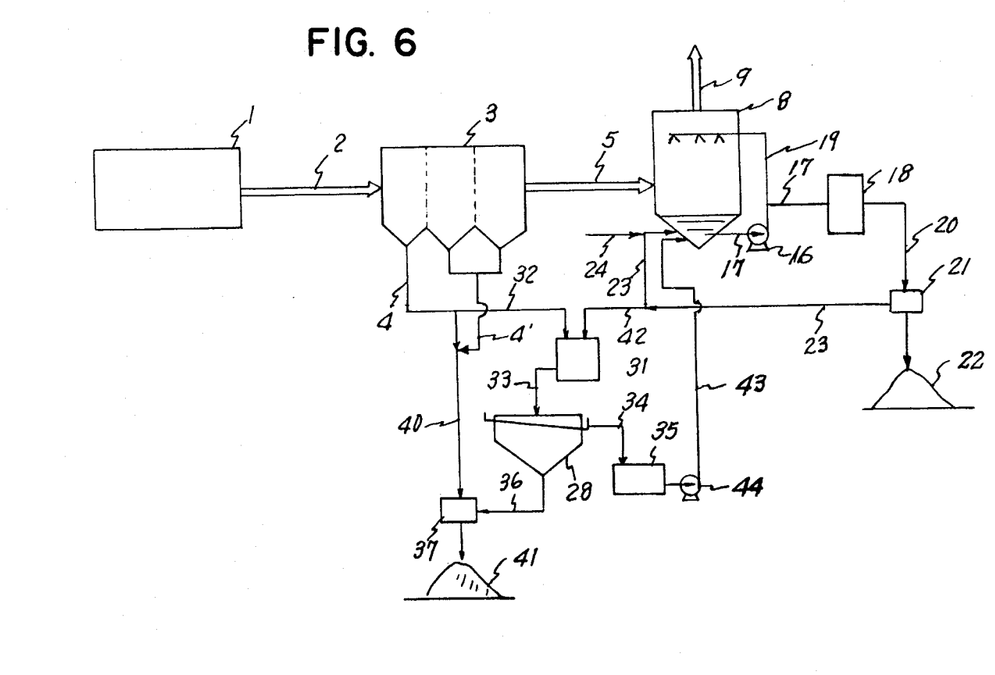
FIG. 6 is a flow sheet of another preferred embodiment of the process for treatment of a coal boiler exhaust gas according to the present invention.

FIG. 6 is a flow sheet illustrating another preferred embodiment of the present invention, in which the cooling tower 6 in FIG. 4 is omitted.

In the modified embodiment shown in FIG. 6, fly ash, HCl, HF and $SO_2$ contained in the exhaust gas 5 which has passed through the dry type dust collecting device 3 are simultaneously removed in the absorption tower 8. However, especially the HF collected in the absorption tower 8 is converted into $CaF_2$, which hardly precipitates and is subjected to composite reactions with fly ash, HCl and $SO_2$ collected at the same time to be converted into soluble fluorides. As the concentration of the fluorides becomes high, the desulfurizing performance in the absorption tower 8, that is, the reactivity of $CaCO_3$ or $Ca(OH)_2$ with $SO_2$, is greatly lowered. In such case, in the solid-liquid separator 21 fluorides would also accumulate as resolved in the filtrate 23. However, the adverse effect of the fluorides can be prevented by extracting the filtrate 23 containing fluorides through the line 42 to the mixing tank 31.

It is to be noted that reference numeral 43 designates a pipe line for returning a clear liquid obtained in the clear liquid tank 35 to the absorption tower 8 by the pump 44. The treatment of the filtrate 23 containing fluorides which has been fed to the mixing tank 31 through the line 42, is the same as that described in detail above with reference to FIG. 4.

Now two examples according to the present invention will be presented in the following.

EXAMPLE 1

An experiment was conducted in a pilot plant consisting of the flow illustrated in FIG. 4 for an exhaust gas flow of 2,000 $Nm^3/H$ from a coal combustion apparatus. The flow rate and composition of the exhaust gas introduced from the coal combustion apparatus to the pilot plant were as shown in Table 1.

TABLE 1

|  | At the inlet of the dry type dust collecting device | At the outlet of the dry type dust collecting device |
|---|---|---|
| Flow rate of an exhaust gas | 2,000 $Nm^3/H$ | 2,000 $Nm^3/H$ |
| $SO_2$ | 790 ppm | 790 ppm |
| HCl | 22 ppm | 22 ppm |
| HF | 15 ppm | 15 ppm |
| Fly ash | 12 $g/Nm^3$ | 230 $mg/Nm^3$ |

The composition of the exhaust gas at the outlet of the cooling tower 6 is as shown in Table 2.

TABLE 2

| $SO_2$ | 760 ppm |
|---|---|
| HCl | 2 ppm |
| HF | 1 ppm |
| Fly Ash | 35 $mg/Nm^3$ |

The concentrations of fluorides, chlorides and solid material of fly ash contained in the cleaning liquid 11 in the cooling tower 6 are as shown in Table 3.

TABLE 3

| F | 1.2 g/l |
|---|---|
| Cl | 13 g/l |
| Solid Material | 14 g/l |

It is to be noted that the fluorides and chlorides are almost not contained in the solid material, but form soluble compounds. Then a flow of gypsum-separated filtrate of 1 l/H through the line 42 and a flow of a cleaning liquid of 20 l/H from the cleaning tower 6 were fed to the mixing tank 31, and at the same time the fly ash 4 collected on the upstream side of the dry type dust collecting device 3 was supplied to the mixing tank 31 at a rate of 4 kg/H.

The dry type dust collecting device 3 has such structure that it is divided into three stages consisting of a multicyclone, a first electrostatic dust collector and a second electrostatic dust collector disposed in series and arranged in the above sequence from the upstream side, and the fly ash 4 supplied to the mixing tank 31 is a part of the fly ash collected in the multicyclone.

The clear liquid consisting of the overflow of the thickener 28 was fed to the clear liquid tank 35 at a rate of 15 l/H, while the sludge consisting of the underflow of the thickener 28 was fed to the fly ash mixing machine 37 at a rate of 10 kg/H. Then, in the clear liquid of the overflow of the thickener 28 the concentration of fluorides was 0.021 g/l, which was greatly reduced as compared to the concentration of 1.2 g/l of the soluble fluorides contained in the cleaning liquid 11. With regard to the fly ash to be added to the mixing tank 31, even when the discharge ash at the bottom of the coal boiler 1 was added besides the fly ash 4 collected in the multicyclone, the same fluoride removing effect was obtained, but when the fly ash 4' collected in the first and second electrostatic dust collectors provided on the exhaust gas downstream side of the dry type dust collecting device was added to the mixing tank 31, the concentration of fluorides in the clear liquid became 0.22 g/l, and thus the removal effect for fluorides was degraded.

These results are illustrated in FIG. 5 to show the variation of neutralization reactions of the cleaning liquid 11 as a function of the locations where the fly ash was collected, as described above.

From the results, it was found that in the case where discharge ash from the bottom of the coal boiler 1, fly ash taken out of the devices located on the upstream side of the dry type dust collecting device 3 such as, for example, an air heater, an economizer, etc., or fly ash having a large particle diameter collected in a multicyclone was employed, fluorides were absorbed almost as a solid material, in the thickener 28 also the sedimentation velocity was so large that a classification performance was good, thus the thickener 28 could be made in a small size, and also adhesive moisture contained in the sludge was reduced.

In the fly ash mixing machine 37, the mixed ash 41 was obtained by adding the fly ash fed from the dry type dust collecting device 3 to the sludge consisting of the underflow of the thickener 28 in varying mixing ratios, and the result was obtained that if fly ash of at least three times (in weight) as much as the weight of water in the sludge is added to the sludge, then bleeding would not occur in the mixed ash 41. In addition, as a result of operation in the flow illustrated in FIG. 4, it was confirmed that the concentration of fluorides in the cooling tower 6 could be lowered and corrosion of the equipment would not occur.

Moreover, although not illustrated in FIG. 4, if fly ash of approximately the same amount as the weight of the sludge of the underflow the thickener 28 was added to the sludge and calcium hydroxide of about one-tenth in weight of the sludge was added thereto by making use of an $SO_2$ absorbent fed to the absorption tower 8, and if the mixture was left as it was for one week after they were mixed in a paste state, then a rigid solid material having a compression strength of 17 kg/cm$^2$ was obtained.

EXAMPLE 2

An experiment was conducted in a pilot plant consisting of the flow illustrated in FIG. 6, for an exhaust gas flow of 2,000 Nm$^3$/H from a coal boiler. The flow rate and composition of the exhaust gas at the inlet and outlet of the dry type dust collecting device were almost the same as those shown in Table 1. The composition of the outlet gas 9 from the absorption tower 8 was as shown in Table 4.

TABLE 4

| | |
|---|---|
| $SO_2$ | 82 ppm |
| HCl | 1 ppm or less |
| HF | 1 ppm or less |
| Fly Ash | 40 mg/Nm$^3$ |

The concentrations of fluorides and chlorides contained in the gypsum-separated filtrate flowing through the line 42 were as shown in Table 5.

TABLE 5

| | |
|---|---|
| F | 1.0 g/l |
| Cl | 13 g/l |

The gypsum-separated filtrate was fed through the line 42 to the mixing tank 31 at a rate of 20 l/H, and at the same time, fly ash 4 collected on the exhaust gas upstream side of the dry type dust collecting device 3 was fed to the mixing tank 31 at a rate of 4 kg/H. From the thickener 28 to the clear liquid tank 35 was fed a clear liquid at a rate of 15 l/H, and the concentration of fluorides in the clear liquid became 0.015 g/l. Thereby it was confirmed that accumulation of fluorides in the absorption tower 8 could be prevented, the lowering of the reaction velocity between $CaCO_3$ or $Ca(OH)_2$ and $SO_2$ could be prevented, and also corrosion of the equipment would not occur.

In addition, with regard to the method for mixing fly ash with sludge in the fly ash mixing machine 37, almost the same method as that described in Example 1 was employed, and the properties of the mixed ash 41 obtained as a result of the mixing were approximately identical to those described in Example 1.

As described above, by employing the method according to the present invention, the following effects and advantages can be achieved:

(1) Since the moisture in the sludge obtained from a discharge liquid used in treatment of an exhaust gas is absorbed by means of highly hygroscopic fly ash to obtain only slightly wet mixed ash, elimination of a discharge water in exhaust gas treatment is made possible, and hence, measures taken in the prior art for avoiding secondary public nuisances have become unnecessary.

(2) Since the aforementioned mixed ash has an appropriate degree of wetness, handling thereof such as in transportation by trucks becomes easy. In this case, if fly ash of approximately the same weight as that of sludge is added to the sludge and further calcium hydroxide of about one-tenth in weight of the sludge is added thereto, and if it is left as it is for about one week, then it becomes a rigid solid material having a compression strength of about 17 kg/cm$^2$, and hence the handling thereof will become even easier.

(3) As the fly ash for absorbing moisture in the sludge, the fly ash obtained during the process for treatment of an exhaust gas is utilized, and hence there is no need to specifically prepare an absorbent, and thus the subject method is economical.

(4) By making use of the fact that fly ash having the larger particle size collected in the dry type dust collecting device can react with fluorides more effectively, the fluorides can be treated still more effectively, and economy of the apparatus can be enhanced by efficiently treating harmful compounds produced upon treatment of an exhaust gas and realizing a durability of the apparatus.

(5) Since a clear water obtained by the treatment of a discharge water is recirculated through the apparatus, a large amount of water can be saved.

Since many changes could be made in the above construction and many apparent widely different embodiments of this invention could be made without departing from the scope thereof, it is intended that all matter contained in the above description or shown in the accompanying drawings shall be interpreted as illustrative and not as a limitation to the scope of the invention.

What is claimed is:

1. In a method for treatment of an exhaust gas which comprises the steps of treating an exhaust gas discharged from a coal combustion apparatus in a dry type dust collecting device to remove fly ash from said exhaust gas, treating the resultant exhaust gas from said dry type dust collecting device in a cooling tower where halogen gas in said exhaust gas is absorbed to produce a liquid containing a halogen compound, treating the exhaust gas from said cooling tower in an absorption tower where $SO_2$ is absorbed to produce a slurry containing calcium sulfite, oxidizing said slurry containing calcium sulfite into a gypsum slurry, and separating said gypsum slurry into solid and liquid to recover gypsum and at the same time to obtain filtrate separated from said gypsum, the improvement wherein:
    (1) said dry type dust collecting device is divided into at least two sections along the direction of gas flow to separate the collected fly ash into at least two parts, one part being fly ash collected on the most upstream side of said gas flow, and a second part being fly ash collected on the downstream side of said gas flow;
    (2) said filtrate separated from said gypsum, and said liquid containing said halogen compound from said cooling tower, are mixed with a part of said fly ash collected at said most upstream side of said gas flow in said dry type dust collecting device to form a mixed slurry; and
    (3) said mixed slurry is separated into clear water and sludge, said clear water is supplied to said cooling tower, and said sludge is mixed with a part of said fly ash collected in said dry type dust collecting device.

2. A method according to claim 1, wherein the amount of said fly ash, collected in said dry type dust collecting device, mixed with said sludge is at least three times by weight of the amount of water contained in said sludge.

3. A method according to claim 1, wherein the amount of said fly ash, collected in said dry type dust collecting device, mixed with said sludge is substantially equal in weight to the weight of said sludge, and further, calcium hydroxide in an amount of about one-tenth the weight of said sludge is added to said mixture of fly ash and sludge.

4. In a method for treatment of an exhaust gas which comprises the steps of treating an exhaust gas discharged from a coal combustion apparatus in a dry type dust collecting device to remove fly ash from said exhaust gas, treating the resultant exhaust gas from said dry type dust collecting device in an absorption tower where halogen gas and $SO_2$ in said exhaust gas are absorbed to produce a slurry containing calcium sulfite, oxidizing said slurry containing calcium sulfite into a gypsum slurry, and separating said gypsum slurry into solid and liquid to recover gypsum and at the same time to obtain filtrate separated from said gypsum, the improvement wherein:

(1) said dry type dust collecting device is divided into at least two sections along the direction of gas flow to separate the collected fly ash into at least two parts, one part being fly ash collected on the most upstream side of said gas flow, and a second part being fly ash collected on the downstream side of said gas flow;

(2) said filtrate separated from said gypsum is mixed with a part of said fly ash collected at said most upstream side of said gas flow in said dry type dust collecting device to form a mixed slurry; and (3) said mixed slurry is separated into clear water and sludge, said clear water is supplied to said absorption tower, and said sludge is mixed with a part of said fly ash collected in said dry type dust collecting device.

5. A method according to claim 4, wherein the amount of said fly ash, collected in said dry type dust collecting device, mixed with said sludge is at least three times by weight of the amount of water contained in said sludge.

6. A method according to claim 4, wherein the amount of said fly ash, collected in said dry type dust collecting device, mixed with said sludge is substantially equal in weight to the weight of said sludge, and further, calcium hydroxide in an amount of about one-tenth the weight of said sludge is added to said mixture of fly ash and sludge.

* * * * *